United States Patent [19]
DeSena

[11] Patent Number: 4,703,582
[45] Date of Patent: Nov. 3, 1987

[54] ANIMAL TRAP

[76] Inventor: Joseph DeSena, 36-27 12th St., Long Island City, N.Y. 11106

[21] Appl. No.: 924,985

[22] Filed: Oct. 30, 1986

[51] Int. Cl.⁴ .......................................... A01M 23/18
[52] U.S. Cl. ...................................................... 43/61
[58] Field of Search ..................................... 43/61, 60

[56] References Cited

U.S. PATENT DOCUMENTS

| | | | |
|---|---|---|---|
| 1,048,318 | 12/1912 | Kanter | 43/61 |
| 1,524,692 | 2/1925 | Dick | 43/61 |
| 1,686,432 | 10/1928 | Bleck | 43/61 |
| 1,765,081 | 6/1930 | Lee | 43/61 |
| 1,866,776 | 7/1932 | Sloulin | 43/61 |
| 3,174,250 | 3/1965 | Gilbert | 43/61 |

Primary Examiner—Gene P. Crosby
Attorney, Agent, or Firm—Richard L. Miller

[57] ABSTRACT

An animal trap is provided for luring and capturing live, small animals and holding them locked inside without causing physical damage to the captive animal. The trap has an entrance and an exit in line of sight of each other so as not to intimidate an animal from entering the trap.

3 Claims, 4 Drawing Figures

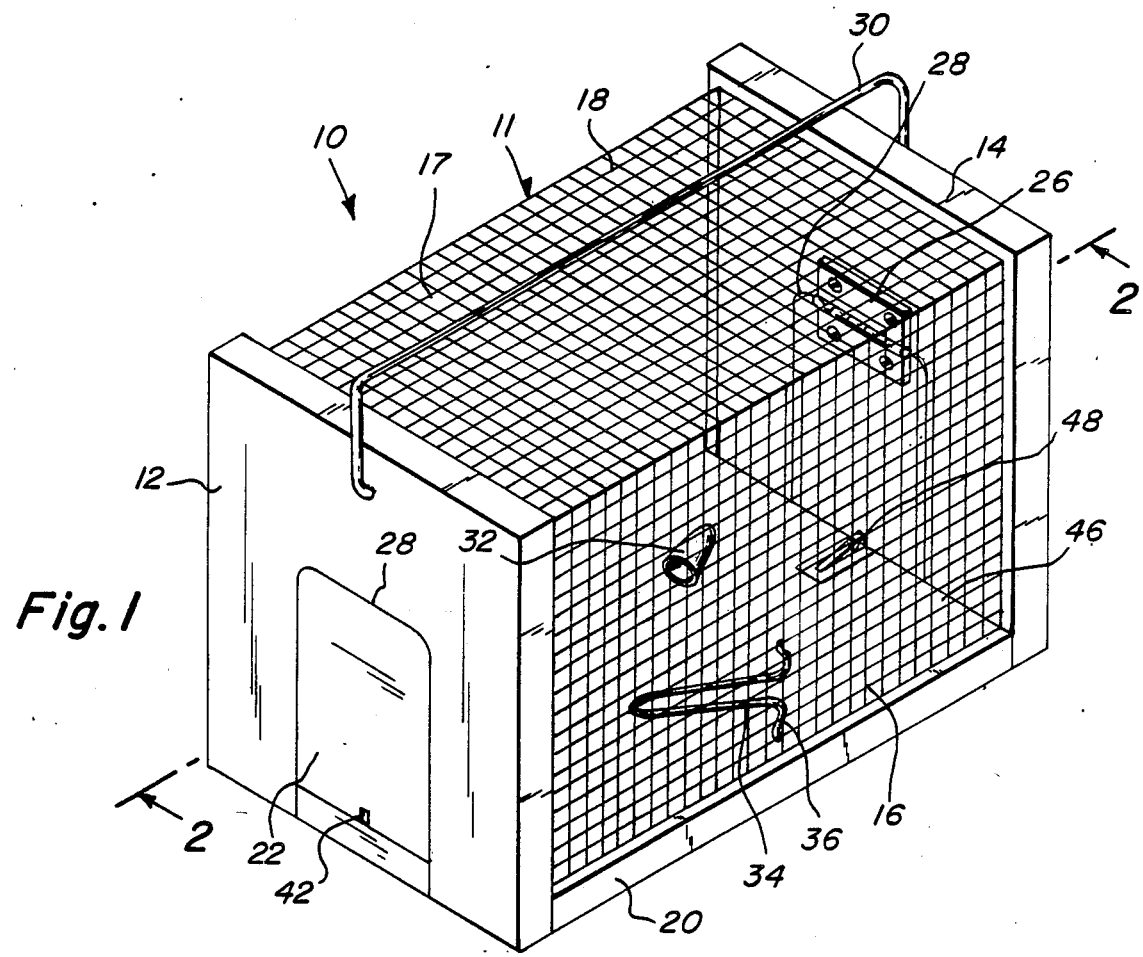
Fig. 1
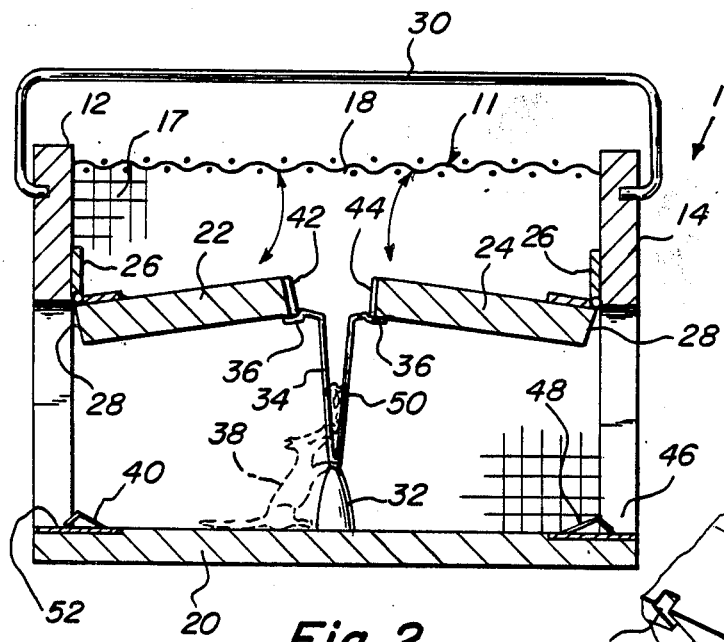
Fig. 2
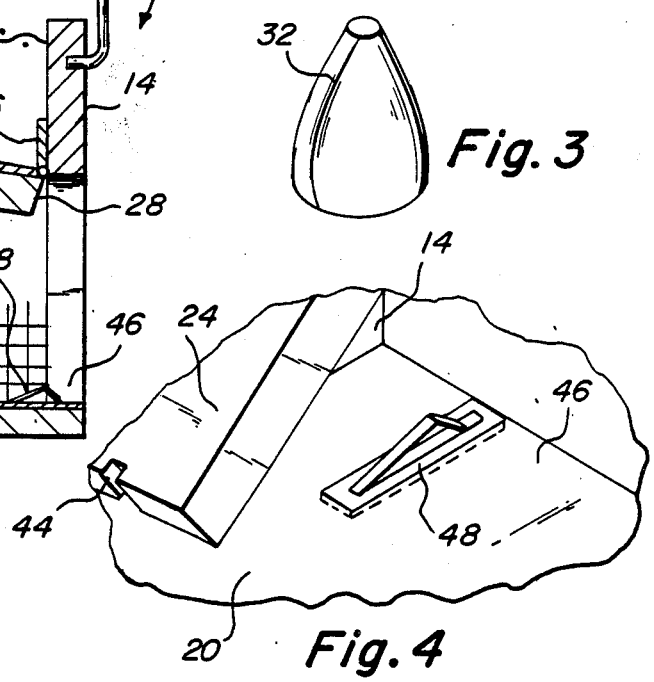
Fig. 3
Fig. 4

# ANIMAL TRAP

BACKGROUND OF THE INVENTION

The instant invention relates to capturing animals and more generally to animal traps.

Numerous animal traps have been provided in the prior art that are adapted to capture small animals alive and unharmed. For example, U.S. Pat. Nos. 443,975; 1,048,318 and 1,866,766 all are illustrative of such prior art. While these units may be suitable for the particular purpose to which they address, they would not be as suitable for the purpose of the present invention as hereafter described because these prior devices tend to intimidate a wild animal to such a degree as to cause them to be fearful to even enter the trap.

SUMMARY OF THE INVENTION

A primary object of the present invention is to provide an animal trap that will overcome the shortcomings of the prior art devices this is mostly accomplished because the present instant invention appears to have an obvious exit path for an entering animal so that the animal will not be intimidated to such a degree that it will not enter the trap.

Another object is to provide an animal trap that can be made out of wood, metal or plastic.

An additional object is to provide an animal trap that can capture all types of small animals.

A further object is to provide an animal trap that captures small animals without hurting them.

A still further object is to provide an animal trap that is simple and easy to use.

A still further object is to provide an animal trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the invention with the doors shown in a closed position.

FIG. 2 is a cross sectional view taken along line 2—2 in FIG. 1 of the invention with the doors open and an animal about to release the trap shown in phantom.

FIG. 3 is an enlarged perspective view of part of the door propping member shown in greater detail.

FIG. 4 is an enlarged detail view of one of the locking devices for holding a door closed.

DETAILED DESCRIPTION OF THE PREFERRED EMBODIMENTS

Turning now descriptively to the drawings, in which like reference characters denote like elements throughout the several views, FIGS. 1 through 4 illustrate an animal trap for capturing live, small animals. The animals trap generally illustrated by numeral 10 is a cage 11 having sides: 12, 14, 16 and 17; a top 18 and bottom 20.

Two doors 22 and 24 are attached by hinges 26 to sides 12 and 14 of the cage 11 and are pivoted at their tops 28. Slots 42 and 44 are located on each door bottom in the middle thereof and cooperate with locking devices 40, and 48.

Attached to the top 18 of the trap 10 is a handle 30 used for carrying the trap.

A bait 50 may be provided to lure an animal 38 inside the cage 11.

In FIG. 2 it is seen how a frustum 32 rests on the bottom of the cage 11 inside, and a V-shaped piece of wire 34 sits on top of the frustum 32.

The V-shaped piece of wire 34 has bent edges 36 and is used to keep the doors 22 and 24 propped open.

As also seen in FIG. 2 when an animal 38 attempts to eat bait 50 and disturbs V-shaped piece of wire 34 the doors 22 and 24 are released and gravity causes them to simultaneously close.

Locking devices 40 and 48 are provided on the bottom 20 of the cage 11 at opposite ends 52 and 46.

The locking devices 40 and 48 pass through the doors 22 and 24 through slots 42 and 44, and are well known to those skilled in the art.

Once doors 22 and 24 pass over the locking devices 40 and 48 they cannot be opened from the inside but can be opened with sufficient force from the outside.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An animal trap for capturing small animals which comprises:
   (a) a cage for capturing said animal without causing physical damage;
   (b) a plurality of doors hinged on said cage through which said animal enters said cage, wherein said plurality of door are arranged within the line of sight of said animal when entering said cage whereby it appears to said animal that there is at least a second exit for leaving said trap;
   (c) a bait holding means for propping said plurality of doors open, wherein said bait holding means is a V-shaped piece of wire having the top portion bent so that an edge of said doors may each rest thereon whereby said doors are held open;
   (d) gravitational means responsive to movement of said bait for simultaneously closing said plurality of doors; and
   (e) latch means for automatically locking said plurality of door closed.

2. An animal trap for capturing small animals as recited in claim 1, wherein said means responsive to movement of said bait is said V-shaped piece of wire and a frustum upon which an apex of said V-shaped rest.

3. An animal trap for capturing small animals as recited in claim 2, wherein said latch means is a mechanical latch.

* * * * *